US009835042B2

(12) United States Patent
Mack

(10) Patent No.: US 9,835,042 B2
(45) Date of Patent: Dec. 5, 2017

(54) REGULATING FLAP ARRANGEMENT OF AN EXHAUST-GAS TURBOCHARGER

(71) Applicant: BorgWarner Inc., Auburn Hills, MI (US)

(72) Inventor: Sebastian Mack, Bubenheim (DE)

(73) Assignee: BorgWarner Inc., Auburn Hills, MI (US)

( * ) Notice: Subject to any disclaimer, the term of this patent is extended or adjusted under 35 U.S.C. 154(b) by 300 days.

(21) Appl. No.: 14/398,138

(22) PCT Filed: Apr. 29, 2013

(86) PCT No.: PCT/US2013/038585
§ 371 (c)(1),
(2) Date: Oct. 31, 2014

(87) PCT Pub. No.: WO2013/169507
PCT Pub. Date: Nov. 14, 2013

(65) Prior Publication Data
US 2015/0125272 A1    May 7, 2015

(30) Foreign Application Priority Data

May 11, 2012    (DE) .................... 20 2012 004 719 U

(51) Int. Cl.
*F01D 17/10*    (2006.01)
*F02B 37/18*    (2006.01)
*F16J 15/54*    (2006.01)

(52) U.S. Cl.
CPC .......... *F01D 17/105* (2013.01); *F02B 37/186* (2013.01); *F05D 2220/40* (2013.01);
(Continued)

(58) Field of Classification Search
CPC ....... F02B 37/183; F02B 37/186; F16J 15/50; F16J 15/545; F16J 15/3236;
(Continued)

(56) References Cited

U.S. PATENT DOCUMENTS 3,603,601 A * 9/1971 Blomeyer ............ F16J 15/3496
277/353
3,695,777 A * 10/1972 Westphal .............. F01D 17/162
415/147
(Continued)

FOREIGN PATENT DOCUMENTS

DE    102009030520 A1 *    1/2010    ........... F01D 17/145
DE    102008057207 A1 *    5/2010    ............ F01D 11/003
(Continued)

OTHER PUBLICATIONS

English translation of DE 102009030520.*
(Continued)

*Primary Examiner* — Woody Lee, Jr.
*Assistant Examiner* — Topaz L Elliott
(74) *Attorney, Agent, or Firm* — Eric L. Doyle; Stephan A. Pendorf; Patent Central LLC

(57) ABSTRACT

A regulating flap arrangement (1) of an exhaust-gas turbocharger (3) having a flap shaft (5), which is guided by means of a bushing (10) in the turbine housing (2). A shaped sealing ring (13), as viewed in cross section, has at least one cavity (14). The shaped sealing ring (13) bears simultaneously against the first sealing surface (11) and against the second sealing surface (12), and in order to impart its sealing action, is compressed and deformed in the axial direction (15) of the flap shaft (5).

5 Claims, 5 Drawing Sheets

(52) U.S. Cl.
CPC ...... *F05D 2240/55* (2013.01); *F05D 2250/75* (2013.01); *F16J 15/545* (2013.01); *Y02T 10/144* (2013.01)

(58) Field of Classification Search
CPC .. F16J 15/3228; F16J 15/3456; F01D 17/105; F01D 11/003; F05D 2250/75; F05D 2240/55; F05D 2220/41; F16K 41/023; F16F 1/34; F16F 1/373
USPC ................ 277/491, 626, 647, 353, 382, 395
See application file for complete search history.

(56) References Cited

U.S. PATENT DOCUMENTS

| | | | | |
|---|---|---|---|---|
| 3,863,938 | A * | 2/1975 | Nicholson | F16J 15/0887 277/369 |
| 5,716,052 | A | 2/1998 | Swensen et al. | |
| 6,983,940 | B2 * | 1/2006 | Halling | F16J 15/0887 277/604 |
| 9,464,565 | B2 * | 10/2016 | Yamaguchi | F02B 37/183 |
| 2004/0109761 | A1 | 6/2004 | Scherrer | |
| 2006/0188368 | A1 | 8/2006 | Jinnai et al. | |
| 2006/0213195 | A1 * | 9/2006 | Leavesley | F02B 37/18 60/605.1 |
| 2009/0226304 | A1 * | 9/2009 | Frankenstein | F01D 11/003 415/159 |
| 2012/0319020 | A1 * | 12/2012 | Doehler | F02B 37/183 251/214 |

FOREIGN PATENT DOCUMENTS

| | | | | |
|---|---|---|---|---|
| DE | 102009022109 | A1 * | 11/2010 | ........... F16J 15/3204 |
| DE | 102009050182 | A1 * | 5/2011 | ............. F01D 17/12 |
| JP | 11229886 | A | 8/1999 | |
| JP | 2005351089 | A | 12/2005 | |
| JP | 2008309111 | A1 | 12/2008 | |

OTHER PUBLICATIONS

English translation of DE 102008057207.*
English translation of DE 102009050182.*
English translation of DE 102009022109.*
Lagae, Xavier. "How to Choose the Right Metal Seal" Pumps and Process Magazine Dec. 2011 retrieved from http://www.mainpress.com/nederlands/dossier_pompen/pdf/metalseals.pdf.*
Parker. Metal Seals Design Guide retrieved from http://www.parker.com/literature/Praedifa/Catalogs/Catalog_MetalSeals_PTD3359-EN.pdf published Mar. 2016.*
International Search Report in International Application No. PCT/US2013/038585 dated Aug. 21, 2013.

* cited by examiner

REGULATING FLAP ARRANGEMENT OF AN EXHAUST-GAS TURBOCHARGER

BACKGROUND OF THE INVENTION

Field of the Invention

The invention relates to a regulating flap arrangement of an exhaust-gas turbocharger provided with a turbine housing.

Description of the Related Art

FIG. 5 shows a regulating flap arrangement 100 which is already known. The figure shows a bushing 110 which is inserted into a turbine housing. A flap shaft 105 is rotatably mounted in said bushing 110. A flap shaft lever 109 is fastened to one end of the flap shaft 105. Said flap shaft lever 109 is connected to a flap plate 104, for example for opening and closing a wastegate duct. The sealing between the flap shaft 105 and the bushing 110 is realized by means of two piston rings 101 which are arranged centrally in the flap shaft 105. The regulating flap arrangement 100 which is already known is only inadequately capable of compensating the gaps and play that arise during operation owing to running play, tilting and rotation, such that the escape of exhaust gas with soot as leakage gas into the surroundings of the engine cannot be satisfactorily prevented.

It is therefore an object of the present invention to provide a regulating flap arrangement which permits sealing between the bushing and the flap shaft in a reliable manner.

BRIEF SUMMARY OF THE INVENTION

The sealing according to the invention is realized in each case by means of a shaped sealing ring which is arranged on the face-side end of the bushing. The shaped sealing ring can be compressed axially and, in so doing, provide sealing between the face-side end of the bushing and the outer flap lever or the inner flap shaft lever. It is alternatively possible for the shaped sealing ring to be compressed radially. In the case of the radial arrangement, the shaped sealing ring provides sealing between the flap shaft and an inwardly directed wall of the bushing.

In both cases, use is made according to the invention of a shaped sealing ring which, as viewed in its cross section, has at least one cavity. In particular, the shaped sealing ring is of V-shaped or S-shaped form. Owing to said cavity, it is possible for the shaped sealing ring to be compressed or deformed to an adequate extent in the axial or radial direction. The deformation of the shaped sealing ring results in a stress in the shaped sealing ring which counteracts the deforming force and which thus causes the shaped sealing ring to impart its sealing action.

The outer flap lever or the inner flap shaft lever may also be manufactured in one piece with the flap shaft.

The shaped sealing ring is in particular manufactured from metal and arranged in the secondary force flux in order to avoid inadmissibly intense compression.

By means of the new design of the regulating flap arrangement, it is achieved that the gaps and play arising during operation are compensated, and the escape of exhaust gas and soot is substantially prevented. The problem of the contamination of adjacent components with soot and the ingress of exhaust gas into the driver's cab is thereby also solved. Emissions into the environment are eliminated, and the exhaust gas and the soot can pass into the atmosphere only via the catalytic converter and the particle filter.

BRIEF DESCRIPTION OF THE SEVERAL VIEWS OF THE DRAWINGS

Further details, advantages and features of the present invention become apparent from the following description of exemplary embodiments with reference to the drawing, in which.

DETAILED DESCRIPTION OF THE INVENTION

Figure 1:
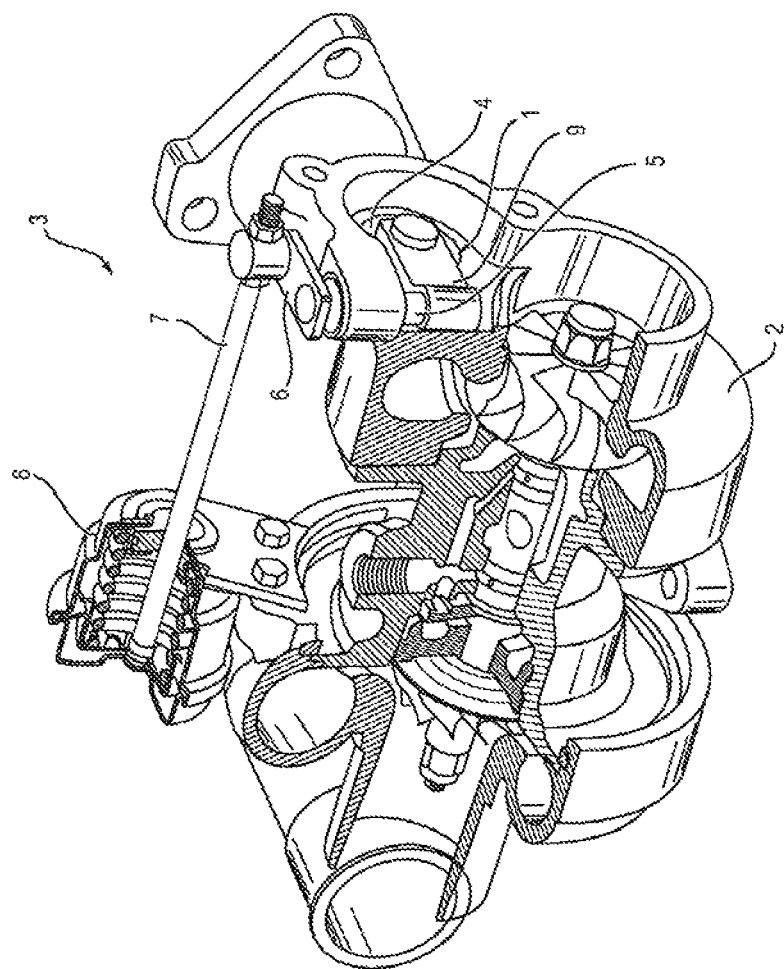
FIG. 1 shows a perspective, sectional illustration of an exhaust-gas turbocharger according to the invention.

FIG. 1 illustrates an exhaust-gas turbocharger 3 which has a turbine housing 2 in which a regulating flap arrangement 1 according to the invention, which will be explained in more detail with reference to FIGS. 2 to 4, can be arranged.

FIG. 1 shows the basic design of the regulating flap arrangement 1 composed of a flap plate 4 for opening and closing a wastegate duct. The flap plate 4 is connected via an inner flap shaft lever 9 to a flap shaft 5. Said flap shaft 5 extends through the turbine housing 2 to the outside. An outer flap lever 6 is fastened to the outer end of the flap shaft 5. The flap lever 6 is in turn connected to a regulating rod 7. The regulating rod 7 is moved by means of a drive 8.

Figure 2:
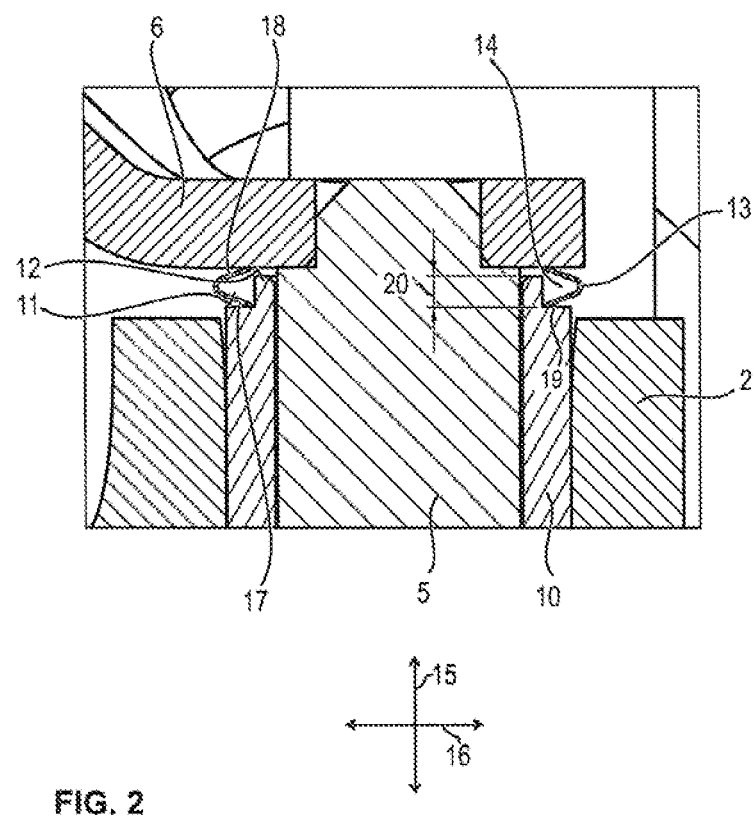
FIG. 2 shows a detail view of a regulating flap arrangement according to the invention as per a first exemplary embodiment.

FIG. 2 shows the first exemplary embodiment of the regulating flap arrangement 1 in detail. According to FIG. 2, a bushing 10 is situated in the turbine housing 2. The flap shaft 5 is rotatably received in said bushing 10. An axial direction 15 and a radial direction 16 are defined with reference to the flap shaft 5. A groove 19 is formed on the face-side end of the bushing 10. In this exemplary embodiment, the groove 19 is outwardly open in the radial direction 16 and is outwardly open in the axial direction 15. A shaped sealing ring 13 is arranged in the groove 19.

A face-side end of the bushing 10 constitutes a first sealing surface 11. A second sealing surface 12 is situated opposite said first sealing surface 11. The second sealing surface 12 is formed on the flap lever 6. The shaped ring 13 provides sealing between said two sealing surfaces 11, 12.

In this exemplary embodiment, the shaped sealing ring 13 is of V-shaped form. The V-shaped form comprises a first leg 17 and a second leg 18 as viewed in cross section. Said two legs 17, 18 are not parallel to one another, such that each leg 17, 18 has a free end and the other ends of the legs 17, 18 are connected to one another. The free ends of the legs 17, 18 bear against the sealing surfaces 11, 12. The sealing action arises as a result of an axial compression and deformation of the shaped sealing ring 13 in the axial direction 15. As a result of said deformation, a stress is generated in the shaped sealing ring 13 such that the shaped sealing ring 13 presses its legs 17, 18 against the sealing surfaces 11, 12.

The groove 19 has a groove depth 20 in the axial direction 15. The groove depth 20 is selected such that an excessively intense compression of the shaped sealing ring 13 is avoided. Specifically, before the shaped sealing ring 13 is destroyed, the flap lever 6 abuts against the bushing 10 and the shaped sealing ring 13 is securely received within the groove 19.

The shaped sealing ring 13 has a cavity 14. Owing to said cavity 14, the shaped sealing ring 13 differs significantly from a simple seal of disk-shaped form. The cavity 14 is important for attaining an adequate deformation of the shaped sealing ring 13 when the latter is compressed, and thus also building up an adequate stress in the shaped sealing ring 13.

Figure 3:
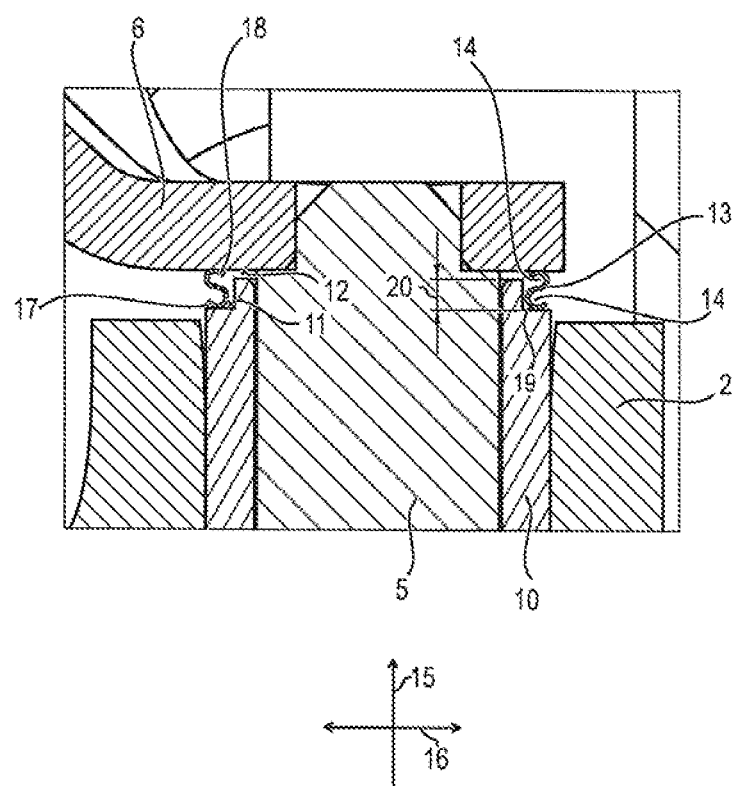
FIG. 3 shows a detail view of the regulating flap arrangement according to the invention as per a second exemplary embodiment.

FIG. 3 shows the regulating flap arrangement 1 as per the second exemplary embodiment. Identical or functionally identical components are denoted by the same reference numerals in all of the exemplary embodiments. The first two exemplary embodiments differ in that the shaped sealing ring is of S-shaped form in the second exemplary embodiment. As a result, the shaped sealing ring 13 has two cavities 14. In the second exemplary embodiment, too, the shaped sealing ring 13 is compressed in the axial direction 15.

Figure 4:
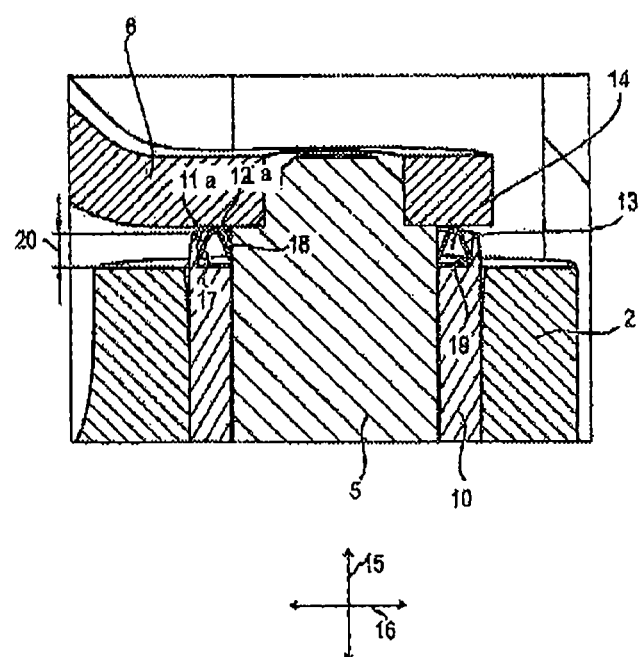
FIG. 4 shows a detail view of the regulating flap arrangement according to the invention as per a third exemplary embodiment.
Figure 5:
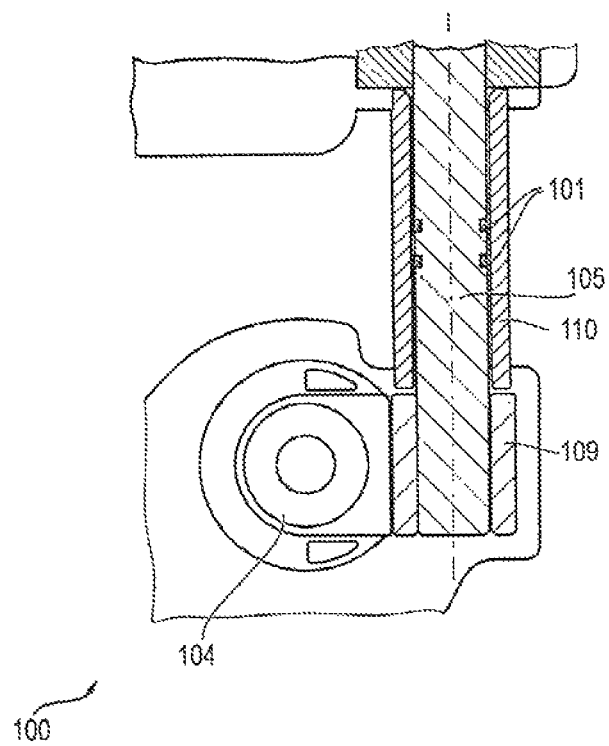
FIG. 5 shows a regulating flap arrangement according to the prior art.

FIG. 4 shows the regulating flap arrangement 1 as per the third exemplary embodiment. Identical or functionally identical components are denoted by the same reference numerals in all of the exemplary embodiments. In the third exemplary embodiment, the shaped sealing ring 13 is of V-shaped form with two legs 17, 18. By contrast to the first exemplary embodiment, however, the V shape of the shaped sealing ring 13 in the third exemplary embodiment opens in the axial direction 15.

In the third exemplary embodiment, the shaped sealing ring 13 is braced in the radial direction 16. This requires a first radial sealing surface 11a on an inner wall, which faces toward the flap shaft 5, of the bushing 10. The second radial sealing surface 12a is correspondingly defined on the lateral surface of the flap shaft 5. The groove 19 on the face-side end of the bushing 10 thus opens outwardly in the axial direction 15 and inwardly in the radial direction 16. The shaped sealing ring 13 bears again with the free ends of its legs 17, 18 against the sealing surfaces 11a, 12a.

Even though the invention has been explained above on the basis of the example of a regulating flap arrangement, the sealing arrangement may also be used in an exhaust-gas turbocharger with a variable turbine geometry.

In addition to the above written description of the invention, reference is hereby explicitly made to the diagrammatic illustration of the invention in FIGS. 1 to 4 for additional disclosure thereof.

LIST OF REFERENCE SIGNS

1 Regulating flap arrangement
2 Turbine housing
3 Exhaust-gas turbocharger
4 Flap plate
5 Flap shaft
6 Outer flap lever
7 Regulating rod
8 Drive
9 Inner flap shaft lever
10 Bushing
11 First sealing surface
11a First radially sealing surface
12 Second sealing surface
12a Second radially sealing surface
13 Shaped seal
14 Cavity
15 Axial direction
16 Radial direction
17 First leg
18 Second leg
19 Groove
20 Groove depth
100 Regulating flap arrangement according to the prior art
101 Piston rings according to the prior art
104 Flap plate according to the prior art
105 Flap shaft according to the prior art
109 Flap shaft lever according to the prior art
110 Bushing according to the prior art

The invention claimed is:

1. A regulating flap arrangement (1) of an exhaust-gas turbocharger (3) provided with a turbine housing (2),
   having a flap plate (4), and
   having a flap shaft (5),
   which is connected via an outer flap lever (6) to a regulating rod (7) of a drive (8),
   which is connected via an inner flap shaft lever (9) to the flap plate (4), and
   which is guided by means of a bushing (10) in the turbine housing (2), the bushing having
   a first sealing surface (11) on a face-side end of the bushing (10),
   a second sealing surface (12), which is situated opposite the first sealing surface (11), on the outer flap lever (6) or the inner flap shaft lever (9), and further comprising
   a shaped compression sealing ring (13) formed from a single bent sheet which, as viewed in cross section, has at least one cavity (14), wherein the shaped sealing ring (13) bears simultaneously with sliding contact against the first sealing surface (11) and with sliding contact against the second sealing surface (12), and wherein the shaped sealing ring (13), in order to impart its sealing action, is compressed and deformed in the axial direction (15) of the flap shaft (5)
   wherein a groove (19) which is outwardly open in the axial direction (15) and which serves for receiving the shaped sealing ring (13) is formed in the bushing (10).

2. The regulating flap arrangement as claimed in claim 1, wherein the shaped sealing ring (13) is, by means of two legs (17, 18) which are non-parallel with respect to one another, of V-shaped form as viewed in cross section, wherein the shaped sealing ring (13) bears only with the free ends of the legs (17, 18) against the first and second sealing surfaces (11, 12).

3. The regulating flap arrangement as claimed in claim 1, wherein the shaped sealing ring (13) is S-shaped as viewed in cross section.

4. The regulating flap arrangement as claimed in claim 1, wherein the first sealing surface (11) is arranged parallel to the second sealing surface (12).

5. The regulating flap arrangement as claimed in claim 1, wherein the shaped sealing ring (13) is composed of metal.

* * * * *